United States Patent [19]

Mendenhall

[11] Patent Number: 5,387,424
[45] Date of Patent: Feb. 7, 1995

[54] PROCESS FOR BONDING FORMED MEAT TO BONE

[75] Inventor: Von T. Mendenhall, Hyde Park, Utah

[73] Assignee: Utah State University, North Logan, Utah

[21] Appl. No.: 217,482

[22] Filed: Mar. 23, 1994

[51] Int. Cl.⁶ .......................... A23L 1/31; A23P 1/10
[52] U.S. Cl. ................................. 426/272; 426/513; 426/641; 426/644
[58] Field of Search ............... 426/272, 641, 513, 644, 426/104, 92

[56] References Cited

U.S. PATENT DOCUMENTS

| | | | |
|---|---|---|---|
| 2,553,113 | 5/1951 | Rogers | 426/282 |
| 3,499,767 | 3/1970 | Schlamb | 426/272 |
| 3,679,434 | 7/1972 | Bard et al. | 426/272 |
| 3,821,445 | 6/1974 | Okamura et al. | 426/641 |
| 3,911,154 | 10/1975 | Weatherspoon | 426/282 |
| 4,101,711 | 7/1978 | Stillman | 426/129 X |
| 4,210,677 | 7/1980 | Huffman | 426/272 |
| 4,258,068 | 3/1981 | Huffman | 426/272 |
| 4,264,633 | 4/1981 | Bradshaw | 426/641 |
| 4,377,597 | 3/1983 | Shapiro et al. | 426/272 X |
| 4,534,984 | 8/1985 | Kuehne | 426/412 |
| 4,539,210 | 9/1985 | O'Connell et al. | 426/104 X |
| 4,544,560 | 10/1985 | O'Connell | 426/513 X |
| 4,810,514 | 3/1989 | Guenther | 426/513 |
| 4,921,714 | 5/1990 | Matthews et al. | 426/641 X |
| 4,975,294 | 12/1990 | Cohen | 426/272 |
| 5,328,712 | 7/1994 | Stevison et al. | 426/641 |

FOREIGN PATENT DOCUMENTS

| | | | |
|---|---|---|---|
| 2-238865 | 9/1990 | Japan | 426/641 |

*Primary Examiner*—Arthur L. Corbin
*Attorney, Agent, or Firm*—Thompson E. Fehr

[57] ABSTRACT

A process for bonding formed meat to bone to create the appearance and texture of a natural cut of meat by utilizing techniques known in the art to release protein from pieces of meat, which released protein forms an adhesive substance on the surface of the meat, leaving a thin layer of meat on the bone to which the formed meat is to be attached, immersing the bone in an aqueous solution of salt and phosphate, removing the bone from the solution, and pressing the formed meat about the bone to achieve the desired appearance. This product may subsequently be cooked, or frozen and then cooked. The same type of protein-to-protein bonds which hold the formed meat together attach the formed meat to the thin layer of meat that was left on the bone. Optionally, frozen particles of fat may be added to the formed meat in order to improve flavor; and modified low-temperature starch may be included in the formed meat to retain moisture within the formed meat during cooking.

50 Claims, No Drawings

PROCESS FOR BONDING FORMED MEAT TO BONE

BACKGROUND OF THE INVENTION

1. Field of the Invention

This invention relates to a method of bonding restructured meat, synonymously termed "formed meat," to a bone in order to simulate a natural cut of the same type of meat which contains a bone.

2. Description of the Related Art

Many patents have issued for processes to form restructured meat by cutting the meat into pieces which are then treated to cause protein to be released from the pieces and accumulate on the surface of such pieces so that when the pieces are placed together under appropriate conditions, protein-to-protein bonds will be formed which hold the pieces together and, in many processes, create a formed meat product which has the appearance and texture of a more expensive cut of the same type of meat.

U.S. Pat. No. 4,210,677 utilizes a mechanical tenderizer to permit the extraction of muscle protein from meat that has been cut into cubes; combines the, therefore, adhesive-covered cubes of meat with thin wafers of frozen meat; massages or tumbles this combination, with the optional addition of unspecified amounts of salt and phosphate; presses this meat into a desired initial shape; wraps such pre-formed meat with a film-like material; freeze tempers this wrapped product such that it remains deformable; presses the product into a final desired shape; slices the product; and freezes the slices.

Two related patents, U.S. Pat. Nos. 4,539,210 and 4,544,560, prepare chunks of lean meat; optionally tenderize such chunks, typically by using a rotary knife tenderizer having multiple blades; optionally add an unspecified amount of water-soluble salt or phosphate; optionally add fat particles to the lean chunks in a vacuum blender used for massaging; massage the meat at a temperature between 24° F. and 38° F. to produce a sticky protein exudate on the chunks; and simultaneously extrude a fat mass and the massaged meat through separate but adjacent extrusion heads to form a structured meat product of definite shape imparted by the extrusion heads.

The process of U.S. Pat. No. 4,810,514 invokes separating and removing individual muscles and adjacent muscle groups; removing at least a portion of the connective tissue from these individual muscles and adjacent muscle groups; aligning the muscle fiber of the individual muscles and adjacent muscle groups so that the muscle fiber directions of the individual muscles and adjacent muscle groups are essentially parallel to each other and extend in a longitudinal direction; optionally adding as a preferred binder a water solution of 0.5 percent by weight NaCl and 0.25 percent by weight sodium tripolyphosphate, although the patent also discloses the possibility of utilizing KCl and sodium pyrophosphate, trisodium phosphate, or the like; passing the fiber-aligned muscles and adjacent muscle groups through a plurality of cutting blades; and compressing and shaping the resultant product as desired.

In the process of U.S. Pat. No. 3,499,767 the surface cell structure of small pieces of poultry is broken by mechanical action; water-soluble molecularly dehydrated phosphate is added in the presence of NaCl, e.g., 1.75 percent NaCl and 0.5 percent phosphate; the pieces of poultry are pressed together; and this product is cooked. The preferable phosphate is a mixture of sodium tripolyphosphate and sodium pyrophosphate.

For the technique of U.S. Pa. No. 3,679,434 a substantial number of the pieces of meat weigh at least one-half pound. These pieces are injected with edible polyphosphate salt, with or without NaCl, to retard development of rancidity. (One example utilizes 1.5 percent NaCl and 0.5 percent sodium tripolyphosphate.) The pieces of meat are then mechanically worked to develop a tacky exudate on their surfaces and subsequently pressed together for cooking, or freezing and then cooking.

U.S. Pat. No. 4,975,294 mechanically tenderizes meat by vibration and/or friction during slicing. The resultant thin slices are thoroughly intertangled and formed into a restructured meat product. This technique is stated to release myosin (a type of protein), for binding, without using chemicals such as salt and phosphates.

In the process of U.S. Pat. No. 4,264,633 pieces of meat are impregnated with a curing composition which contains a source of phosphate ions. The meat is then cooked to "set" the meat protein. The pieces of meat are then coated with an "edible thermostatable heat-settable glue emulsion" which optionally includes starch—preferably, an uncooked starch such as potato starch, maize starch, and the like—to "act as [a]water-absorbing . . . [agent]which will bind any water which may be liberated during the heat-setting stage of the process and which would otherwise interfere with the binding process." The coated pieces of meat are then compacted and heated.

To extract myosin, the process of U.S. Pat. No. 4,377,597 uses an aqueous salt solution, preferably of 1 percent NaCl and 0.5 percent food grade phosphates. However, it may contain from 0.5 to 1.5 percent NaCl and "lesser concentrations of the food-grade phosphates". This is applied to a combination of strips and chunks of meat which are then formed into a desired shape.

U.S. Pat. No. 3,821,445 adds 0.5 to 3.5 percent salt by weight to grain-size pieces of meat; the meat is kneaded, shaped, and repeatedly frozen and defrosted.

No prior art patent, however, discloses or claims a process for attaching formed meat to a bone.

SUMMARY OF THE INVENTION

To create the natural appearance of a cut of meat from which formed meat has been created or the natural appearance of a more expensive cut of meat which one desires to imitate with formed meat, it is sometimes necessary to have a bone attached to the formed meat. Pricing advantages also exist when one sells meat containing a bone.

The meat to be attached to the bone may be processed in any manner, including the techniques described in prior art patents, that releases protein to form an adhesive surface on pieces of meat. It is then pressed into a preliminary shape.

A thin layer of meat is left on the bone or bones. Each bone to which meat is to be bonded is then placed in any solution, such as those described in the prior art patents of the type which releases protein to the surface of the meat when the meat is massaged or tumbled.

The bone is next withdrawn from the solution and inserted into the shaped pieces of meat, with an orientation similar to the natural orientation of bone in a cut of such meat one wishes to duplicate, i.e., when one is recreating the cut of meat from which the bone and pieces of meat were initially cut, or to imitate, i.e., when one is using cheaper cuts of meat to create formed or restructured meat having the appearance and texture of a more expensive cut of such meat. Of course, the displacement caused by insertion of the bone necessitates reshaping the structured or formed meat to achieve the desired appearance.

The restructured meat containing the bone is then processed just as would be the restructured meat alone, to create the protein-to-protein bonds that hold the restructured meat together and, in the present invention, also bind the restructured meat to the bone, or, more accurately, to the thin layer of meat which was left attached to the bone.

In the naturally occurring attachment of muscle tissue to bone, protein from the muscle tissue is actually incorporated within the structure of the bone. The most critical inventive step for the present invention was the recognition that if a thin layer of meat is left attached to the bone, restructured meat can be successfully attached to the bone by the formation, between the restructured meat and the thin layer, of the same protein-to-protein bonds that hold the restructured meat together.

DESCRIPTION OF THE PREFERRED EMBODIMENT

It is desired to create formed meat containing a bone which will have, when cooked, a natural shape and texture for the meat or the natural shape and texture of a cut of meat which is more expensive than the meat used to create the formed meat.

The term "meat" designates the soft tissues of animals that are used as food. "Meat" includes red meat, poultry, and seafood. Red meat traditionally means beef, pork, and lamb. Poultry indicates domesticated fowl valued for their meat, such as chickens, turkeys, ducks, geese, and guinea.

The process described herein is limited to imitating different cuts of meat from the same type of animal because the flavor of any given type of animal is unique.

Within a given type of animal, the texture of different cuts of meat is very similar except for tenderness. Thus, as is discussed below, cheaper cuts of meat are tenderized to duplicate higher priced cuts, such as loin and rib.

Initially in the present process, external fat is removed from meat by cutting. Bones are also eliminated from the meat by cutting. The remaining meat is then cut into pieces.

The size of the pieces of meat is not critical. However, the larger the pieces are, the more natural will be the texture of the subsequently produced formed meat. Unfortunately, though, the maximum size is limited by the mechanical tenderizer used in the next step. Therefore, the pieces tend to have an average weight of 100 grams with an average minimum thickness of 2.54 centimeters.

Each piece of meat is then tenderized, preferable by multi-blade tenderizing equipment. None of the meat is ground, though, because grinding breaks muscle fibers excessively, preventing the attainment of a natural texture.

Next, the tenderized meat is combined with 0.5 percent (by weight, with the percentage based on the total desired resultant product) salt (sodium chloride or potassium chloride), 0.15 percent phosphate (by weight, with the percentage based on the total desired resultant product), and sufficient water that the resultant product will preferably be 75 percent water (by weight), although a range of 70 percent to 80 percent is acceptable. "Phosphate" may contain, but is not limited to, a mixture of tetrasodium pyrophosphate; acid sodium pyrophosphate; and sodium polyphosphate, glassy.

The combination of meat, salt, phosphate, and water is then either massaged or tumbled. Tumbling is preferably done for a period of one (1) hour, and preferably in commercial tumbling equipment, although this period may be extended to a maximum of two (2) hours. If massaging is utilized, the minimum period is two (2) to three (3) hours. During the tumbling or massaging, the temperature of this combination and of the walls of the tumbling or massaging equipment is maintained between 0° C. and 15° C. This temperature range and the tenderizing step are critical to maximize the extraction of fat from the pieces of meat. The water, which is free at the beginning of the tumbling or massaging, transports—as long as the water remains free—fat from the pieces of meat to the walls of the tumbling or massaging equipment where the fat is deposited.

During the tumbling or massaging, the salt and phosphate facilitate the solubilizing of protein and the chemical bonding of water to the protein to create an adhesive substance on the surfaces of the pieces of meat.

The pieces of meat coated with the adhesive substance are then formed into desired portions and shapes.

As indicated above, in the naturally occurring attachment of muscle tissue to bone, protein from the muscle tissue is actually incorporated within the structure of the bone. Thus, to bond a bone successfully to formed meat, a thin layer, preferably 0.63 centimeters, of muscle tissue must be allowed to remain on the bone when the muscle tissue is initially detached, which is accomplished by hand deboning, i.e., cutting.

If the bone is to be stored more than 24 hours before commencement of the bonding, the bone is frozen to prevent decomposition and spoiling of the attached meat and of the marrow within the bone, which usually occurs within two (2) days.

Whether the bone is fresh or frozen, it is immersed (after thawing, in the case of a bone that has been frozen) in an aqueous solution of 0.5 percent (by weight, in comparison to the weight of the water) salt (sodium chloride or potassium chloride) and 0.15 percent (by weight, in comparison to the weight of the water) phosphate and stored in such solution, for a minimum of one (1) hour and at a temperature of 4.4° C. The phosphate is, preferably, a mixture of tetrasodium pyrophosphate; acid sodium pyrophosphate; and sodium polyphosphate, glassy.

The bone is then removed from the solution and promptly inserted into the shaped collection of pieces of meat that have been coated with the adhesive substance, with an orientation similar to the natural orientation of bone in the cut of meat one desires to duplicate (when one is recreating the meat from which the bone and pieces of meat were initially cut) or imitate (when one is using cheaper cuts of meat to create formed meat having the appearance and texture of a more expensive cut of meat). Of course, the displacement caused by inserting the bone into the shaped or formed meat may require additional shaping of the formed meat to create the desired shape.

Alternatively, the pieces of meat may be first assembled by being pressed together to create a desired appearance about the bone with the thin layer of meat that has been allowed to remain on the bone.

The formed meat containing the bone may next be cooked. The heat of cooking creates a solid matrix from the pieces of meat coated with the adhesive substance, which holds the meat together and gives it a texture closely approximating that of the meat in its original state or, when the period of tenderizing has been extended, the natural texture of the cut of meat that one desires to imitate. Such heat also bonds the formed meat to the bone. If, however, the meat is not frozen before it is cooked, the meat must be supported in its desired shape by an external structure while it is cooked.

If the formed meat containing the bone is not to be cooked promptly, it is frozen; otherwise, because the tissue has been opened (by the cutting and tenderizing), the remaining fat would oxidize and destroy the flavor of the formed meat. Further protection from oxidation is achieved by vacuum packaging, after freezing, the portions of formed meat in a carbon dioxide-nitrogen atmosphere. (Packaging is accomplished by pulling a vacuum to 12 m bar residual. The atmosphere in the package is back flushed with carbon dioxide and nitrogen to create a positive pressure inside the package.) For similar reasons, the tumbling or massaging is done in a vacuum.

Freezing also retains the shape of the portions of formed meat until the heat of cooking creates the solid matrix.

Optionally, portion control may be accomplished after the formed meat has been frozen.

Another option is the addition of any desired flavoring. This must be done prior to the tumbling or massaging.

The primary reason for reducing the fat content of the formed meat is that fat does not bond well to proteins and, therefore, precludes attainment of the desired texture by impairing the formation of protein-to-protein bonds. When red meat is used, however, this process has the additional advantage of producing a formed red meat product with a composition of fat and water which is similar to that of poultry and fish. In fact, the fat content of the finished formed meat can be reduced to as low as three (3) percent.

If a higher percentage of fat is desired in order to achieve improved flavor, a technique may be employed to increase the fat content without losing the improved texture. The fat content is still reduced during the tumbling or massaging. Thereafter fat is added as frozen particles each having an average maximum dimension of one (1) millimeter, although a range of approximately one (1) to three (3) millimeters is acceptable. The frozen particles of fat are mixed into the pieces of meat coated with the adhesive substance at a temperature which is low enough that the fat does not melt and smear onto the surface of the protein, 32° to 34° F. (0° C. to 1.1° C.). Fat has been added in this manner to achieve as high as 18 percent fat without degrading the texture produced when the formed meat is cooked.

If the formed meat has been frozen, it is cooked from the frozen state—rather than first being thawed. This, as noted above, minimizes the opportunity for fat to oxidize and damage the flavor of the formed meat; it also assists in retaining the desired shape of the formed meat until the solid matrix is produced by the cooking.

Higher concentrations of salt and phosphate eliminate the need for freezing but also prevent attainment of the desired texture in the cooked formed meat.

A final option comprises adding modified low-temperature starch to the tenderized meat, when the salt and phosphate are added, in such a quantity that the starch will preferably constitute 2.25 percent (by weight) of the total desired resultant product, although a range of 2.0 to 2.5 percent is acceptable.

The purpose of this starch is to prevent water from leaving the formed meat and accumulating in the container used for holding the meat when it is cooked in a convection oven, such as those aboard commercial airliners. Ordinary starch gels between 130° F. (54.4° C.) and 160° F. (71.1° C.), but modified low-temperature starch gels at 110° F. (43.3° C.). Since the convection ovens described above normally operate at 130° F. (54.4° C.), the modified low-temperature starch gels during the cooking process, physically trapping water and protein inside the formed meat. Such entrapment provides the added benefit of making the cooked formed meat juicier, more tender, and more flavorful.

If too much modified low-temperature starch is used, it interferes with the protein-to-protein bonding that is necessary to create the solid matrix and desired texture. If too little is utilized, the water is not trapped within the formed meat.

Temperatures which are critical to the present process have been specified above. Non-critical temperatures are discussed in this paragraph. Tenderization is normally conducted at 40° F. (4.4° C.); freezing, at −30° F. (−34.4° C.); portion control, at 24° to 26° F. (−4.4° to −3.3° C.); vacuum packaging, at 40° F. (4.4° C.); and frozen storage, at 0° F. (−17.8° C.).

I claim:

1. A process for bonding formed meat to bone, which comprises:
   treating pieces of meat so that protein is released from the pieces to form an adhesive substance on the surfaces of the pieces;
   immersing a bone having a thin layer of meat attached thereto in a solution that releases protein from meat when such meat is subsequently tumbled or massaged;
   removing the bone from the solution; and
   promptly pressing the pieces of meat together about the bone to create a desired appearance.

2. The process for bonding formed meat to bone as recited in claim 1, further comprising:
   cooking the bone and pieces of meat which have been pressed together about the bone.

3. The process for bonding formed meat to bone as recited in claim 1, further comprising:
   freezing the bone and pieces of meat which have been pressed together about the bone.

4. The process for bonding formed meat to bone as recited in claim 3, further comprising:
   cooking the frozen bone and pieces of meat which have been pressed together about the bone.

5. The process for bonding formed meat to bone as recited in claim 1, wherein the treating of pieces of meat so that protein is released comprises:
   tenderizing the pieces of meat;
   combining the tenderized pieces of meat with salt, phosphate, and water; and
   tumbling the combination of meat, salt, phosphate, and water at a temperature between 0° C. and 15° C.

6. The process for bonding formed meat to bone as recited in claim 5, wherein the solution in which the bone is immersed comprises:
   water;

salt, the weight of which is 0.5 percent of the weight of the water; and phosphate, the weight of which is 0.15 percent of the weight of the water.

7. The process for bonding formed meat to bone as recited in claim 6, further comprising:

cooking the bone and pieces of meat which have been pressed together about the bone.

8. The process for bonding formed meat to bone as recited in claim 6, further comprising:

freezing the bone and pieces of meat which have been pressed together about the bone.

9. The process for bonding formed meat to bone as recited in claim 8, further comprising:

cooking the frozen bone and pieces of meat which have been pressed together about the bone.

10. The process for bonding formed meat to bone as recited in claim 6, wherein the salt, phosphate, and water with which the tenderized pieces of meat are combined are in such proportions that the resultant formed meat, by weight, contains:

0.5 percent salt;

0.15 percent phosphate; and 70 to 80 percent water.

11. The process for bonding formed meat to bone as recited in claim 10, wherein:

the salt in both the solution within which the bone is immersed and the salt with which the tenderized pieces of meat are combined is selected from the group consisting of sodium chloride and potassium chloride.

12. The process for bonding formed meat to bone as recited in claim 11, wherein:

the phosphate in both the solution within which the bone is immersed and the phosphate with which the tenderized pieces of meat are combined is a mixture of tetrasodium pyrophosphate, acid sodium pyrophosphate and glassy sodium polyphosphate.

13. The process for bonding formed meat to bone as recited in claim 12, further comprising:

cooking the bone and pieces of meat which have been pressed together about the bone.

14. The process for bonding formed meat to bone as recited in claim 12, further comprising:

freezing the bone and pieces of meat which have been pressed together about the bone.

15. The process for bonding formed meat to bone as recited in claim 14, further comprising:

cooking the frozen bone and pieces of meat which have been pressed together about the bone.

16. The process for bonding formed meat to bone as recited in claim 1, wherein the treating of pieces of meat so that protein is released comprises:

tenderizing the pieces of meat;

combining the tenderized pieces of meat with salt, phosphate, and water; and massaging the combination of meat, salt, phosphate, and water at a temperature between 0° C. and 15° C.

17. The process for bonding formed meat to bone as recited in claim 16, wherein the solution in which the bone is immersed comprises:

water;

salt, the weight of which is 0.5 percent of the weight of the water; and phosphate, the weight of which is 0.15 percent of the weight of the water.

18. The process for bonding formed meat to bone as recited in claim 17, further comprising:

cooking the bone and pieces of meat which have been pressed together about the bone.

19. The process for bonding formed meat to bone as recited in claim 17, further comprising:

freezing the bone and pieces of meat which have been pressed together about the bone.

20. The process for bonding formed meat to bone as recited in claim 19, further comprising:

cooking the frozen bone and pieces of meat which have been pressed together about the bone.

21. The process for bonding formed meat to bone as recited in claim 17, wherein the salt, phosphate, and water with which the tenderized pieces of meat are combined in such proportions that the resultant formed meat, by weight, contains:

0.5 percent salt;

0.15 percent phosphate; and 70 to 80 percent water.

22. The process for bonding formed meat to bone as recited in claim 21, wherein:

the salt in both the solution within which the bone is immersed and the salt with which the tenderized pieces of meat are combined is selected from the group consisting of sodium chloride and potassium chloride.

23. The process for bonding formed meat to bone as recited in claim 22, wherein:

the phosphate in both the solution within which the bone is immersed and the phosphate with which the tenderized pieces of meat are combined is a mixture of tetrasodium pyrophosphate, acid sodium pyrophosphate and glassy sodium polyphosphate.

24. The process for bonding formed meat to bone as recited in claim 23, further comprising:

cooking the bone and pieces of meat which have been pressed together about the bone.

25. The process for bonding formed meat to bone as recited in claim 23, further comprising:

freezing the bone and pieces of meat which have been pressed together about the bone.

26. The process for bonding formed meat to bone as recited in claim 25, further comprising:

cooking the frozen bone and pieces of meat which have been pressed together about the bone.

27. A process for bonding formed meat to bone, which comprises:

cutting external fat from the meat;

removing bones from the meat by cutting;

cutting the meat into pieces;

tenderizing the pieces of meat;

combining the tenderized pieces of meat with such a quantity of salt, phosphate, and water that the resultant pieces of meat will, by weight, contain 0.5 percent salt, 0.15 percent phosphate, and 70 to 80 percent water;

tumbling the combination of meat, salt, phosphate, and water at a temperature between 0° C. and 15° C. such that the surfaces of the pieces of meat become coated with an adhesive substance as a result of the protein being consequently released from the meat;

leaving on the bone, to which the formed meat is to be bonded, a thin layer of meat;

immersing the bone with the thin layer of meat in an aqueous solution of salt and phosphate where the weight of the salt is 0.5 percent of the weight of the water and where the weight of the phosphate is 0.15 percent of the weight of the water;

removing the bone from the solution; and promptly pressing the adhesive-coated pieces of meat together about the bone to create a desired appearance.

28. The process for bonding formed meat to bone as recited in claim 27, further comprising:

cooking the bone and pieces of meat which have been pressed together about the bone.

29. The process for bonding formed meat to bone as recited in claim 27, further comprising:

freezing the bone and pieces of meat which have been pressed together about the bone.

30. The process for bonding formed meat to bone as recited in claim 29, further comprising:

cooking the frozen bone and pieces of meal which have been pressed together about the bone.

31. The process for bonding formed meat to bone as recited in claim 27, further comprising:

after tumbling, mixing into the adhesive-coated pieces of meat, frozen particles of fat, each having an average maximum dimension between 1 and 3 millimeters, while maintaining the temperature low enough that the fat does not melt.

32. The process for bonding formed meat to bone as recited in claim 31, further comprising:

cooking the bone and pieces of meat which have been pressed together about the bone.

33. The process for bonding formed meat to bone as recited in claim 31, further comprising:

freezing the bone and pieces of meat which have been pressed together about the bone.

34. The process for bonding formed meat to bone as recited in claim 33, further comprising:

cooking the frozen bone and pieces of meat which have been pressed together about the bone.

35. The process for bonding formed meat to bone as recited in claim 27, further comprising:

at the time the salt, phosphate, and water are combined with the tenderized pieces of meat, also adding modified low-temperature starch in such a quantity that the starch will constitute 2.0 to 2.5 percent, by weight, of the resultant formed meat.

36. The process for bonding formed meat to bone as recited in claim 35, further comprising:

cooking the bone and pieces of meat which have been pressed together about the bone.

37. The process for bonding formed meat to bone as recited in claim 35, further comprising:

freezing the bone and pieces of meat which have been pressed together about the bone.

38. The process for bonding formed meat to bone as recited in claim 37, further comprising:

cooking the frozen bone and pieces of mean which have been pressed together about the bone.

39. A process for bonding formed meat to bone, which comprises:

cutting external fat from the meat;
removing bones from the meat by cutting;
cutting the meat into pieces;
tenderizing the pieces of meat;
combining the tenderized pieces of meat with such a quantity of salt, phosphate, and water that the resultant pieces of meat will, by weight, contain 0.5 percent salt, 0.15 percent phosphate, and 70 to 80 percent water;

massaging the combination of meat, salt, phosphate, and water at a temperature between 0° C. and 15° C. such that the surfaces of the pieces of meat become coated with an adhesive substance as a result of the protein being consequently released from the meat;

leaving on the bone, to which the formed meat is to be bonded, a thin layer of meat;

immersing the bone with the thin layer of meat in an aqueous solution of salt and phosphate where the weight of the salt is 0.5 percent of the weight of the water and where the weight of the phosphate is 0.15 percent of the weight of the water;

removing the bone from the solution; and promptly pressing the adhesive-coated pieces of meat together about the bone to create a desired appearance.

40. The process for bonding formed meat to bone as recited in claim 39, further comprising:

cooking the bone and pieces of meat which have been pressed together about the bone.

41. The process for bonding formed meat to bone as recited in claim 39, further comprising:

freezing the bone and pieces of meat which have been pressed together about the bone.

42. The process for bonding formed meat to bone as recited in claim 41, further comprising:

cooking the frozen bone and pieces of meat which have been pressed together about the bone.

43. The process for bonding formed meat to bone as recited in claim 39, comprising:

after massaging, mixing into the adhesive-coated pieces of meat, frozen particles of fat, each having an average maximum dimension between 1 and 3 millimeters, while maintaining the temperature low enough that the fat does not melt.

44. The process for bonding formed meat to bone as recited in claim 43, further comprising:

cooking the bone and pieces of meat which have been pressed together about the bone.

45. The process for bonding formed meat to bone as recited in claim 43, further comprising:

freezing the bone and pieces of meat which have been pressed together about the bone.

46. The process for bonding formed meat to bone as recited in claim 45, further comprising:

cooking the frozen bone and pieces of meat which have been pressed together about the bone.

47. The process for bonding formed meat to bone as recited in claim 39, further comprising:

at the time the salt, phosphate, and water are combined with the tenderized pieces of meat, also adding modified low-temperature starch in such a quantity that the starch will constitute 2.0 to 2.5 percent, by weight, of the resultant formed meat.

48. The process for bonding formed meat to bone as recited in claim 47, further comprising:

cooking the bone and pieces of meat which have been pressed together about the bone.

49. The process for bonding formed meat to bone as recited in claim 47, further comprising:

freezing the frozen bone and pieces of meat which have been pressed together about the bone.

50. The process for bonding formed meat to bone as recited in claim 49, further comprising:

cooking the frozen bone and pieces of meat which have been pressed together about the bone.

* * * * *